United States Patent [19]

Kasetty et al.

[11] Patent Number: 5,474,253
[45] Date of Patent: Dec. 12, 1995

[54] WEDGED REELS IN STREAMING TAPE DRIVERS AND TAPE CARTRIDGES

[75] Inventors: Kumaraswamy Kasetty, Shrewsbury; George Saliba, Northboro, both of Mass.

[73] Assignee: Quantum Corporation, Milpitas, Calif.

[21] Appl. No.: 135,098

[22] Filed: Oct. 12, 1993

[51] Int. Cl.⁶ .................................................. B65H 75/02
[52] U.S. Cl. ........................................ 242/614; 242/345
[58] Field of Search ................... 242/610.6, 614, 242/614.1, 118.4, 345, 345.2

[56] References Cited

U.S. PATENT DOCUMENTS

| | | | |
|---|---|---|---|
| 3,276,716 | 10/1966 | Hofbauer | 242/610.6 |
| 3,556,433 | 1/1971 | Abitboul | 242/345.2 |
| 3,802,647 | 4/1974 | Esashi et al. | 242/345 |
| 4,165,051 | 8/1979 | Shiba et al. | 242/614 |
| 4,512,532 | 4/1985 | Dittrich | 242/614.1 |
| 4,932,600 | 6/1990 | Usui et al. | 242/614 |

FOREIGN PATENT DOCUMENTS 0023320 of 1905 United Kingdom ............... 242/118.4

*Primary Examiner*—John M. Jillions
*Assistant Examiner*—William A. Rivera
*Attorney, Agent, or Firm*—David B. Harrison; John C. Chen

[57] ABSTRACT

The present invention is an apparatus for controlled, uniform stacking of tape thereon during read/write operations in tape drives to reduce lateral tape motion during read/write operations. The invention comprises a hub and two flanges that are located on opposite sides of the hub. The flanges have surfaces facing each other extending outwardly from the hub in diverging relationship with each other. The separation between the facing surfaces of the flanges increases from a minimum at a location adjacent to the hub to a maximum at the outer circumferential edge of the flanges in a radial direction extending outwardly from the axis of rotation. Further, the separation between the facing surfaces also increases from a minimum to a maximum along any path of equal distance around the axis of rotation, the location of minimum separation is generally opposite to the location of maximum separation. The minimum separation is such with respect to the width of the tape being spooled thereon as to be effective to ensuring uniform stacking of the tape around the hub as the tape is spooled.

8 Claims, 5 Drawing Sheets

WEDGED REELS IN STREAMING TAPE DRIVERS AND TAPE CARTRIDGES

BACKGROUND OF THE INVENTION

Magnetic tapes are used for data storage in computer systems requiring data removability, low-cost data storage, high data-rate capability, high volumetric efficiency and reusability. Magnetic tape devices include open reels, tape cartridges and cassettes. In the past the container most commonly used to house magnetic tape was the open reel. A simple reel, consisting of a hub upon which the tape is wound and flanges which protect the tape edges, has been used for more than three decades. However, the need for additional tape protection and a reduction in the need for human intervention has led to the use of tape cartridges and cassettes. A cartridge denotes a single reel of tape in a machine-usable container, while a cassette includes a take-up reel as well as the supply reel. Take-up reels are used in magnetic tape drives to spool tape from a tape cartridge or from a reel while information is either written on the tape or read from it.

The need to record large amounts of information to achieve high data rate capability on tapes has been achieved through the use of parallel tracks on a tape. Greater the number of tracks, more information may be stored on the tape. Consequently, track separation on tapes have continued to decrease in order to accommodate more tracks. As a result, it has become very important to control lateral tape motion as the tape passes over a read/write head during read/write operations in order to ensure that the desired track is accurately positioned on the head.

As the tape moves between the supply and take-up reels during operation, it must be guided over the read/write head in a precise manner. Excessive lateral tape motion is undesirable. The transverse position of the tape relative to the read/write head is very important in order to avoid misalignment between the recorded track positions and the head, as such tracking errors may reduce data reliability. During a write operation any lateral motion of tape prevents a straight track from being written on the tape. Further, during a read operation lateral tape motion keeps the read head from being aligned at the center of the desired track on the tape, thus causing data errors.

One approach to solving the problem of lateral tape motion has been to ensure that tape stacks up uniformly on both supply and take-up reels. As shown in FIG. 1 (prior art), it can be seen that as each individual loop stacks, the tape may slide laterally up or down as it spools around the reel, thereby stacking non-uniformly. Non-uniform stacking of tape on the reels causes the tape to experience lateral motion as it passes over the read/write head. When tape spools on a reel, it has to squeeze out the layer of air that is trapped between the outer surface of the tape in the reel and the in-coming tape. Efficient removal of air is important to ensure that tape stacks evenly in the reel. By increasing tape tension and surface roughness, uniformity of stacking may be achieved.

However, the use of higher tape tension to reduce the sliding up and down of the tape as it spools on the reel is not very effective when using thin tapes, as is the norm today. High tape tension increases the head and tape wear.

High surface roughness causes air to be squeezed out easily between successive layers of tape as it spools on the take-up reel. However, increased surface roughness deteriorates data integrity. Therefore, the use of tape having increased surface roughness to control the uniformity of stacking is undesirable.

Another prior art method to control the non-uniform stacking of tape involves making the flange separation of a reel approximately the same as that of the tape width. This approach ensures uniformity of tape stacking by eliminating any redundant space between the flanges that may allow lateral motion of tape as it spools. However this approach leads to excessive tape edge damage due to constant rubbing with the flanges.

SUMMARY OF THE INVENTION

The present invention is an apparatus for controlled, uniform stacking of tape during read/write operations in tape drives to reduce lateral tape motion during read/write operations.

An object of the invention is reduced lateral tape motion as the tape passes over a read/write head assembly during read/write operation.

Yet another object of the invention is controlled, uniform stacking of tape on a reel during read/write operations in streaming tape drives without tape edge damage.

These and other objects are attained, in a broad sense, through the use of various features of the invention. The invention comprises a hub for rotational mounting about an axis, two flanges that are located on opposite sides of the hub and are in spaced apart relationship along the axis of rotation. The flanges have surfaces facing each other extending outwardly from the hub in diverging relationship with each other. The separation between the facing surfaces of the flanges increases from a minimum at a location adjacent to the hub to a maximum at the outer circumferential edge of the flanges in a radial direction extending outwardly from the axis of rotation. Further, the separation between the facing surfaces also increases from a minimum to a maximum along any path of equal distance around the axis of rotation, the location of minimum separation is generally opposite to the location of maximum separation. The minimum separation is such with respect to the width of the tape being spooled thereon as to be effective to ensuring uniform stacking of the tape around the hub as the tape is spooled.

It is an advantage of this invention to reduce data errors during read/write operations. As the uniformly stacked tape passes over the read/write head, the tape experiences reduced lateral motion compared to conventional reels that are currently used.

The foregoing and additional objects, features and advantages of the present invention will become apparent to those skilled in the art from a more detailed consideration of the invention, taken in conjunction with the accompanying drawings.

DETAILED DESCRIPTION OF THE INVENTION

Figure 1:
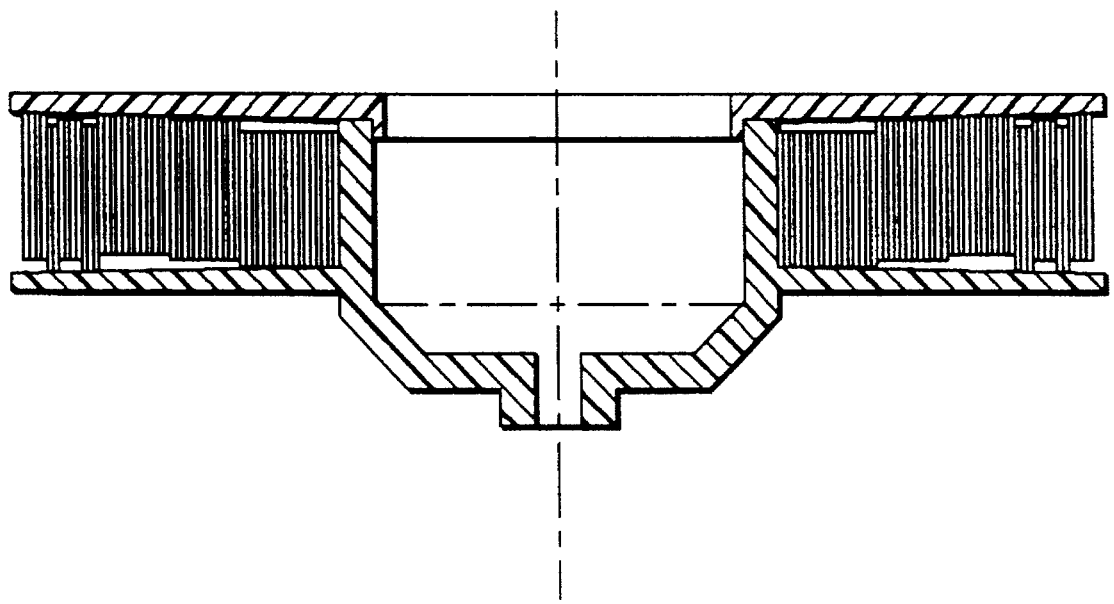
FIG. 1 (PRIOR ART) is a cross-section view of a prior art reel exhibiting non-uniform stacking of tape on the reel.
Figure 2:
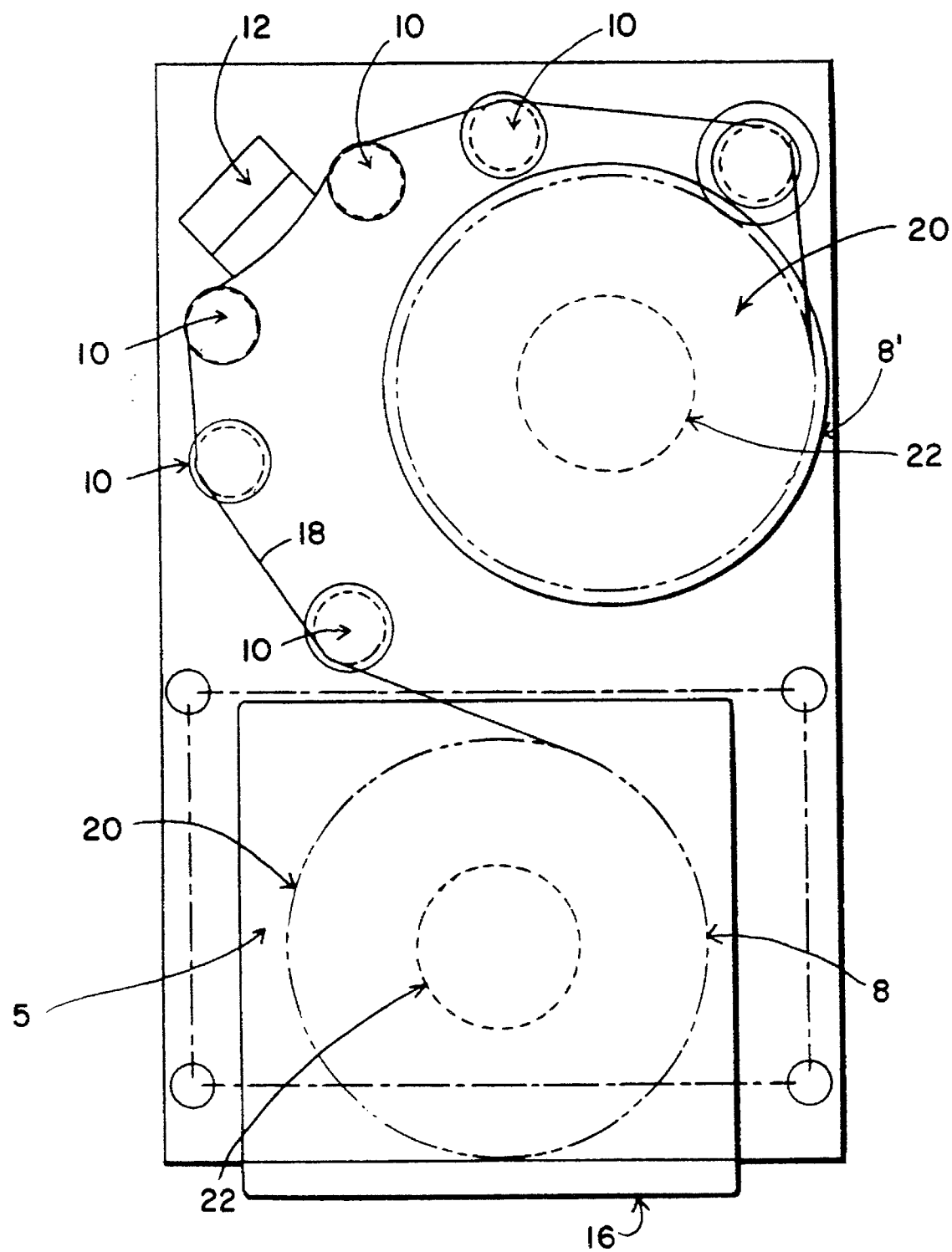
FIG. 2 is a simplified showing of a reel, according to the principles of the invention, in a tape drive arrangement.

Supply and take-up reels, according to the instant invention, are used in magnetic tape drives to spool tape while information is either written on the tape or read from it. As shown in FIG. 2, a tape drive 5 comprises a supply reel 8 having tape 18 spooled onto it, rollers 10, read/write head 12 and a take-up reel 8'. During a read/write operation, the tape 18 spools out of either the supply reel 8 or the take up reel 8', with rollers 10 guiding the tape 18, as it passes over the read/write head 12 and then stacks up on the other reel, one loop after another with increasing radius. For the purpose of ease of explanation the invention will be described with respect to supply reel 8. The same principles apply to take-up reel 8'.

Figure 3:
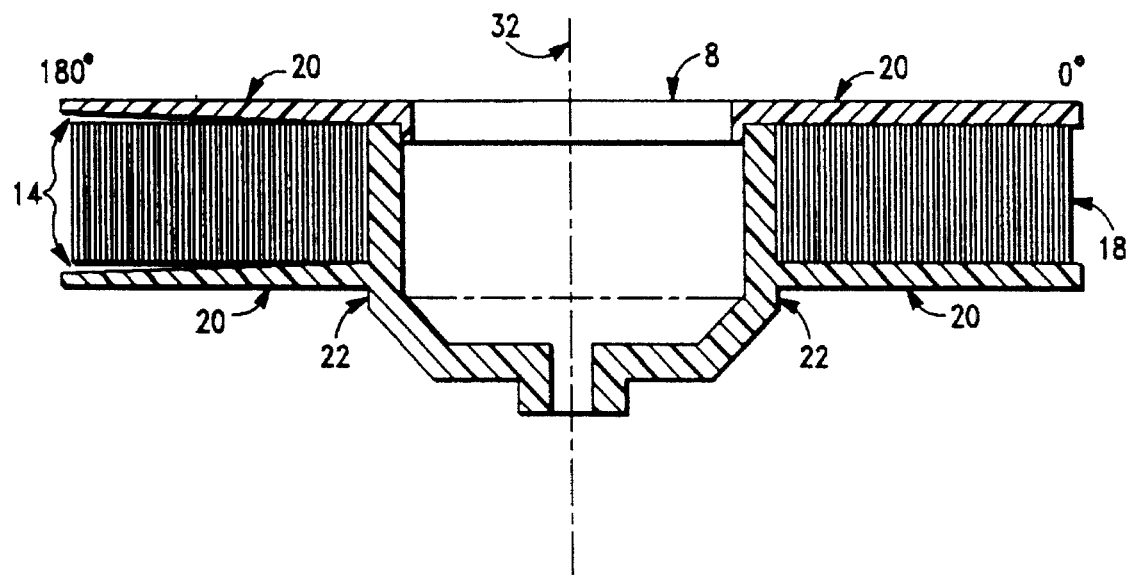
FIG. 3 is a cross-section view of the wedged reel of FIG. 2 exhibiting uniform stacking of tape on the reel.

As shown in FIGS. 2 and 3, reel 8 has two flanges 20, each flange 20 is attached to a hub 22. The hub 22 is cylindrical as shown in FIG. 3, however, other shapes suitable for spooling tape may be used. The flanges 20 are laterally separated by a distance slightly larger than the width of the tape 18. Further, as shown in FIG. 3, the flanges 20 and the hub 22 are made of polycarbonate material. However, other engineering material having stiffness similar to or higher than polycarbonate may be used instead. In an alternate embodiment, one flange 20 is an integral part of the hub 22, while a second flange 20 is attached to the hub 22 during assembly of the reel 8.

Figure 4:
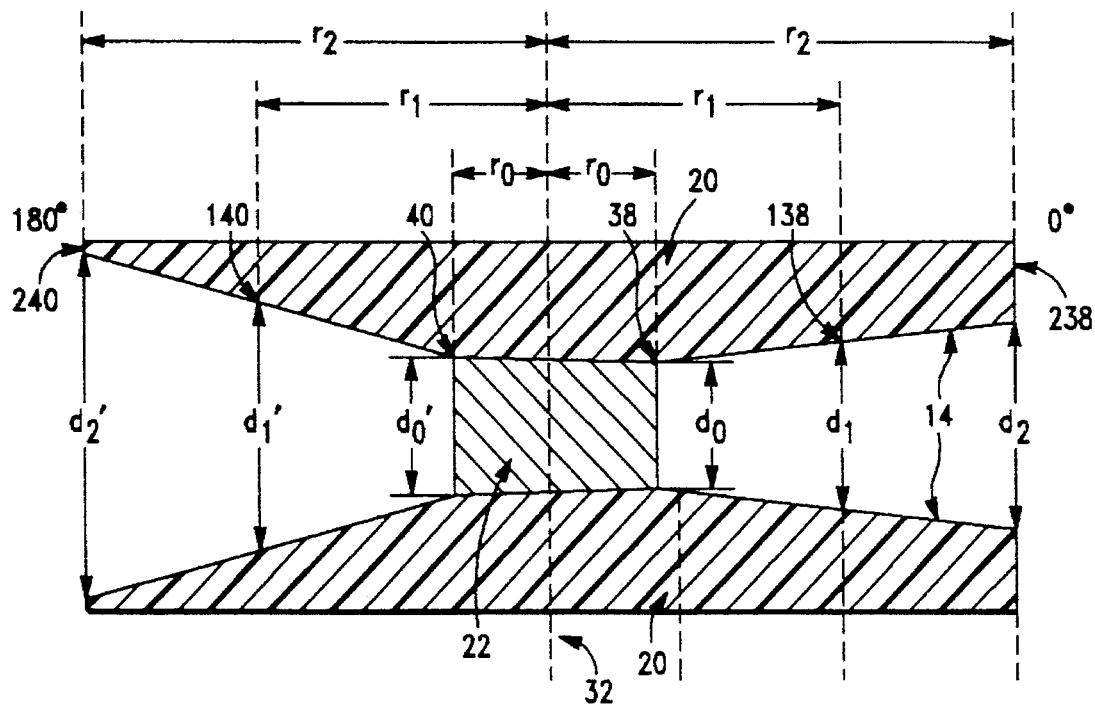
FIG. 4 is an exaggerated and simplified cross-section view of the wedged reel of FIG. 3.

As shown in FIGS. 3 and 4, reel 8 is constructed such that linear surfaces 14 of the flanges 20 facing each other extend outwardly from the hub in a complex diverging relationship with each other. From the cross-section views of the reel 8 it can be seen that the complex diverging relationship between the flanges 20 gives the appearance of a wedge, and hence the name wedged reel. Moreover, it is evident from both FIGS. 3 and 4 that the displayed cross section of the wedged reel is generally asymmetric about the axis of rotation.

The complex diverging relationship has two aspects. The first aspect, can be more clearly understood by FIGS. 5 and 6. As shown, FIG. 5 indicates four reference planes, namely the 0°, 90°, 180° and 270° planes, for purposes of explanation of the first aspect of the complex diverging relationship. The 0°, 90°, 180° and 270° planes are generally perpendicular to flange surface 14. Also, shown in FIG. 5 for purposes of explanation are circular paths $c_0$, $c_1$ and $c_2$, at the flange surface 14, having radii $r_0$, $r_1$ and $r_2$ respectively. Radius $r_0$ being the radius of circular path $c_0$ which is also the radius of the hub 22. Further, as shown, FIG. 6 indicates the variation in flange separation in reel 8 along each of the circular paths $c_0$, $c_1$, and $c_2$. Also, shown in FIG. 6 for purposes of explanation are distances $d_0$ and $d_0'$, $d_1$ and $d_1'$, $d_2$ and $d_2'$, denoting the distance between facing surfaces 14 of flanges 20 along circular paths $c_0$, $c_1$, and $c_2$ respectively.

Figure 5:
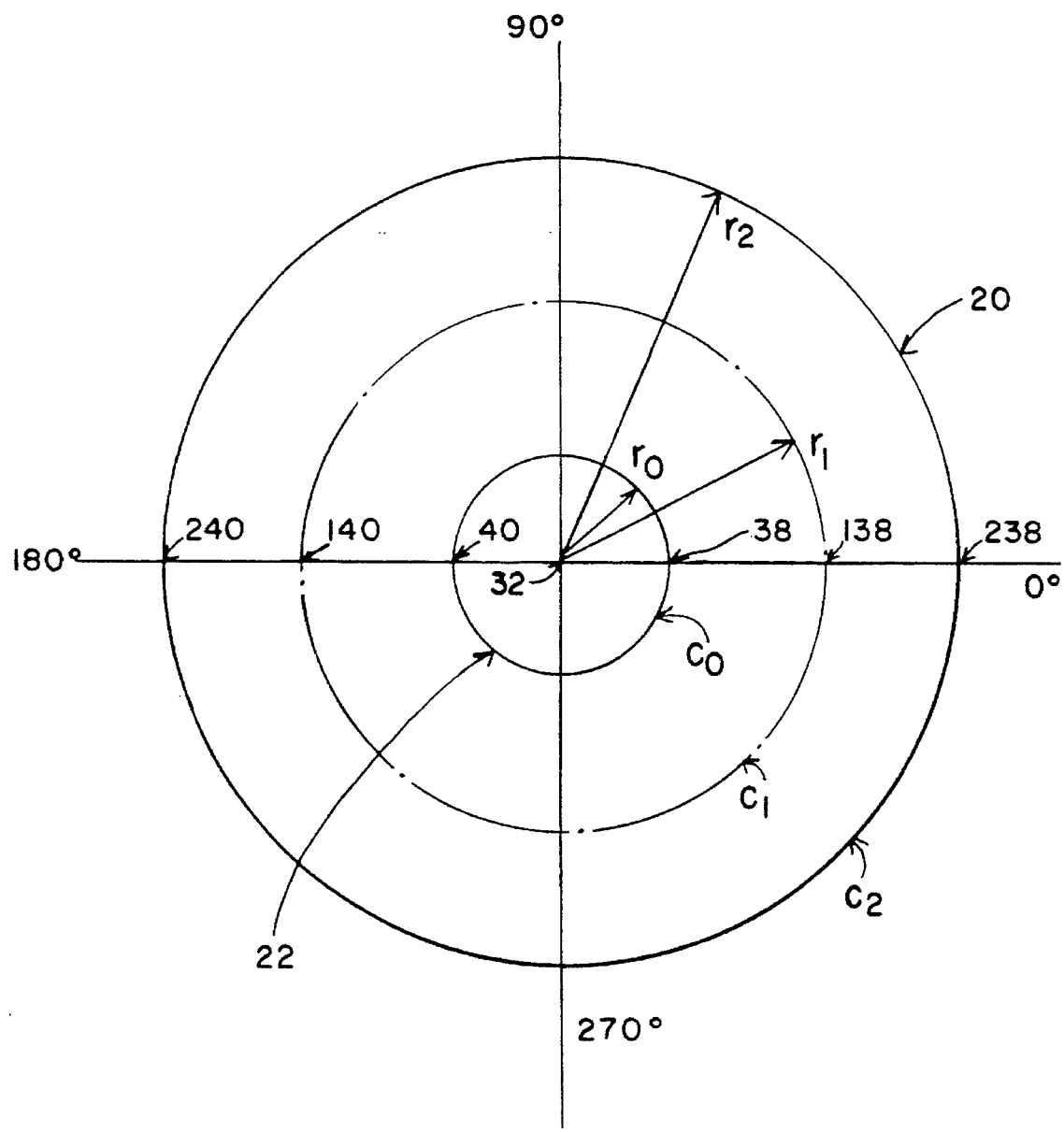
FIG. 5 is a simplified plan view of the wedged reel of FIG. 3.
Figure 6:
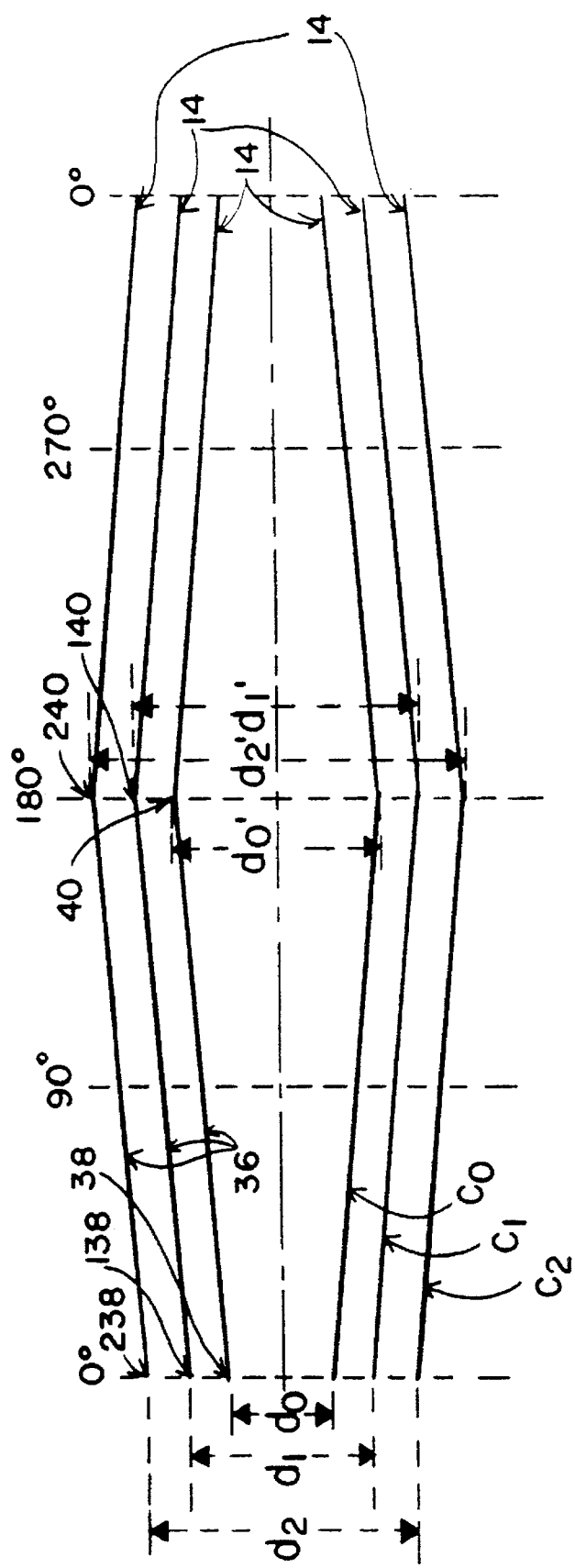
FIG. 6 is an exaggerated illustration of the variation in flange separation in the wedged reel of FIG. 3 along circumferential paths of equal distance around the axis of rotation of the reel.

As shown in FIGS. 5 and 6, the separation between the facing surfaces 14 increases from a minimum (indicated by $d_0$, $d_1$ and $d_2$ in FIG. 6) to a maximum (indicated by $d_0'$, $d_1'$ and $d_2'$ in FIG. 6) along any concentric path, e.g.; paths $c_0$, $c_1$, and $c_2$, around the axis of rotation 32 as shown in FIG. 5. The location of minimum separation 38, 138, 238 being generally opposite to the location of maximum separation 40, 140, 240 as shown in FIGS. 4, 5 and 6.

Further, as shown in FIG. 6, along any circumferential path 36, such as path $c_1$, the intersection of path $c_1$ and reference plane 0° corresponds to the location of minimum separation (indicated by reference numeral 138 in FIGS. 4, 5 and 6) between the facing surfaces 14 of flanges 20 (as shown in FIG. 4) for that particular path 36. Further, along the same circumferential path $c_1$, the intersection of $c_1$ and reference plane 180° defines the location of maximum separation (indicated by reference numeral 140 in FIGS. 4, 5 and 6) between the facing surfaces 14 of flanges 20 (as shown in FIG. 4). The distance between facing surfaces 14 increases gradiently as one travels along the circumferential path $c_1$ from reference plane 0° (where the separation $d_1$ is a minimum) through either reference plane 90° or 270° to reference plane 180° (where the separation $d_1'$ is a maximum); that is, distance between the flange surfaces varies from a minimum $d_1$ at location 138 to a maximum $d_1'$ at location 140 which is 180° away from location 138.

Similarly, as shown in FIGS. 5 and 6, along any of the other circumferential paths 36, such as paths $c_0$, and $c_2$, the intersection of each of these paths with reference plane 0° defines the location of minimum separation (indicated by reference numerals 38 and 238 respectively in FIGS. 4 and 6) between the facing surfaces 14 of flanges 20 for that particular path 36. Further, along each of the same circumferential paths $c_0$, and $c_2$, the intersection of each path and reference plane 180° defines the location of maximum separation (indicated by reference numerals 40 and 240 in FIGS. 4 and 6) between the facing surfaces 14 of flanges 20. As shown in FIG. 6, the separation between facing surfaces 14, increases linearly as one travels along the circumferential paths $c_0$ and $c_2$, from reference plane 0° of minimum separation (where the separation $d_0$ and $d_2$ are minimum separations respectively) through either reference plane 90° or 270° to reference plane 180° of maximum separation (where the separation $d_0'$ and $d_2'$ are maximum separations respectively).

Further as shown in FIG. 4, the minimum separation between flanges 20 at locations along the 0° reference plane (indicated by reference numerals 38, 138 and 238 in FIG. 4) are such with respect to the width of the tape 18 (previously shown in FIGS. 2–3, but not shown in FIG. 4 for clarity of illustration) being spooled thereon as to being effective to ensuring uniform stacking of the tape 18 around the hub 22 as the tape 18 is spooled (as illustrated in FIG. 3).

As shown in FIG. 3, the tape 18 is 0.5 inches wide, while the flanges 20 are approximately 3.7 inches in outer diameter, and the hub 22 is approximately 1.58 inches in diameter. Further, as shown in FIG. 4, along circular path $c_0$ (at the hub 22) at the 180° reference plane, the separation between the flanges 20, denoted by $d_0'$, is a maximum at location 40 at 0.513 inches, while along the same circular path $c_0$ at the 0° reference plane the separation between the flanges 20, denoted by $d_0$, at location 38 is a minimum at 0.503 inches. The gradient, defining the increase of flange separation along path $c_0$, going from $d_0$ at the 0° plane to $d_0'$ at the 180° plane, i.e. from location 38 to 40 is 0.0063 inch/inch. Therefore, the separation between flanges along path $c_0$ at the 90° and the 270° locations is approximately 0.508 inches.

Similarly, along circular path $c_2$, farthest from the hub 22 at the outer circumferential edge of the flanges 20, at the 180° reference plane the separation between the flanges 20, denoted by $d_2'$, is a maximum at location 240 at 0.546 inches, while along the same circular path $c_2$ at the 0° reference plane the separation between the flanges 20, denoted by $d_2$, at location 238 is a minimum at 0.510 inches.

The second aspect of the complex diverging relationship, can be more clearly understood by FIG. 4. As shown, FIG. 4 indicates a simplified cross-section view of reel 8 along the 0° and 180° reference planes. As shown, along any reference plane such as the 0° reference plane extending radially outwardly away from the axis of rotation 32 the separation between the flanges 20 increases uniformly from a minimum at a location 38, denoted by $d_0$, at the hub 22 to a maximum at a flange location 238, denoted by $d_2$, at the outer circumferential edge of each flange 20. Similarly, as shown in FIG. 4, at a radial distance $r_0$, along the 180° the separation denoted by $d_0'$ at location 40 is a minimum. At another radial distance $r_1$, which is greater than $r_0$ and hence further away from the hub, the separation denoted by $d_1'$ at location 140 is greater than $d_0'$. Similarly, as shown in FIG. 4, $d_2'$, the separation at location 240 is greater than $d_1'$, the separation at location 140.

As shown in FIG. 4, at the outer circumferential edge 238 the separation denoted by $d_2$ is 0.510 inches, while at location 38 the separation denoted by $d_0$ is 0.503 inches. As shown, at all intermediate points between 38 and 238 the separation increases linearly in magnitude from its minimum value at 38 to a maximum value at 238. At the outer circumferential edge 240 the separation denoted by $d_2'$ is 0.546 inches, while at location 40 the separation denoted by $d_0'$ is 0.513 inches. At all intermediate points between 40 and 240 the separation increases linearly in magnitude from its minimum value at 40 to a maximum value at 240. Good results have been obtained by using the above dimensions when tape having width of 0.500 inches is used. However the dimensions may be suitably adjusted to accommodate tapes of different widths.

As shown in FIGS. 3 and 4, as the tape 18 spools up on the wedged reel 8, the region of minimum separation of the flanges 20, i.e. locations along the plane of intersection of the 0° reference plane and the flanges (indicated by reference numerals 38, 138 and 238 in FIG. 4), restricts the lateral tape motion of the tape 18 once during every revolution of the reel. By restricting the lateral motion of tape 18 as it spools on the wedged reel 8, the region of minimum flange separation ensures that the layers of tape 18 stack up uniformly and in a controlled manner within the constraints of the narrow separation between flanges 20. At location 38 of least separation between the flanges 20 the separation $d_0$ is 0.503 inches which is slightly larger than the 0.500 inches width of tape 18. Further, the wider separation between the flanges 20 of the wedged reel 8 at it's circumferential outer edges enables the tape 18 to enter the reel 8 without hitting or rubbing against the edges of the flanges 20, hence experiencing reduced tape edge damage.

This wedged reel design can be used in tape drives with tape cartridges, cassettes as well as spools, where a controlled stacking of tape is essential in order to minimize the lateral motion of the tape and hence prevent data errors.

The apparatus that is described above was used for controlled, uniform stacking of tape in tape drives to reduce lateral tape motion during read/write operations. It will be apparent to those skilled in the art that various modifications and variations can be made in the apparatus of the present invention to accommodate different types of tapes. Thus, it is intended that the specification and drawings be considered as exemplary only, with the true scope and spirit of the invention being indicated by the following claims.

We claim:

1. A reel for spooling magnetic storage tape thereon comprising:

a hub for rotational mounting about an axis of rotation;

two flanges, the flanges being located on opposite sides of the hub and being in spaced apart relationship along the axis of rotation, surfaces of the flanges facing each other extending outwardly from the hub in diverging relationship with each other, separation between the facing surfaces of the flanges increasing from a minimum at a location adjacent to the hub to a maximum at the outer circumferential edge of the flanges in a radial direction extending outwardly from the axis of rotation, the separation between the facing surfaces further changes gradiently along a circular path centered on the axis of rotation, the location of minimum separation being generally opposite to the location of maximum separation, the minimum separation being such with respect to the width of the tape being spooled thereon as to ensure uniform stacking of the tape around the hub as the tape is spooled.

2. The reel of claim 1 wherein the minimum separation between flanges along a first radial path is 0.503 inches at a location closest to the hub and 0.510 inches at a location on said radial path at the circumferential outer edge of said flanges; the maximum separation between flanges along a second radial path generally opposite to the first radial path is 0.513 inches at a location closest to the hub and 0.546 inches at a location on said radial path at the circumferential outer edge of said flanges.

3. The reel of claim 1 wherein one flange is an integral part of the hub.

4. The reel of claim 1 wherein the hub is cylindrical.

5. The reel of claim 1 wherein the minimum separation is slightly larger than the width of the tape to be spooled thereon.

6. A reel for spooling magnetic storage tape thereon comprising:

a hub to be mounted for rotation about an axis of rotation a circular flange on each circular end of the cylindrical hub, the flanges extending radially outwardly in diverging relationship and from the axis of rotation of the reel so that separation between them is greater at their circumferential outer edges than at the hub, the separation between the facing surfaces changes gradiently along a circular path centered on the axis of rotation, the location of minimum separation being generally opposite to the location of maximum separation the minimum separation being slightly larger than the width of the tape to be spooled thereon.

7. The reel of claim 6 wherein the hub is cylindrical.

8. A reel for spooling magnetic storage tape thereon comprising:

a cylindrical hub to be mounted for rotation about an axis of rotation;

a circular flange mounted on opposite sides of the hub and centered on the axis of rotation, flanges extending radially outwardly in diverging relationship and from the axis of rotation of the reel so that the space between them is greater at their circumferential outer edges than at the hub, separation between the facing surfaces changes gradiently along a circular path centered on the axis of rotation, the location of minimum separation being generally opposite to the location of maximum separation, the minimum separation being slightly larger than the width of the tape to be spooled thereon, wherein a cross section of the reel taken through the axis of rotation and through the location of minimum separation is asymmetric about the axis of rotation.

* * * * *